United States Patent [19]

Kahr

[11] Patent Number: 5,566,793
[45] Date of Patent: Oct. 22, 1996

[54] RAILWAY BRAKE SHOE

[75] Inventor: Joseph C. Kahr, Southern Pines, S.C.

[73] Assignee: Westinghouse Air Brake Company, Wilmerding, Pa.

[21] Appl. No.: 11,557

[22] Filed: Feb. 1, 1993

[51] Int. Cl.⁶ .................................................. F16D 69/00
[52] U.S. Cl. ................... 188/250 G; 188/250 B; 192/107 R
[58] Field of Search ............... 188/250 R, 250 G, 188/250 B, 257, 235, 236; 192/107 T

[56] References Cited

U.S. PATENT DOCUMENTS

| 557,699 | 4/1896 | Pirch | 188/250 B X |
|---|---|---|---|
| 995,344 | 6/1911 | Goodwin | 188/250 B X |
| 1,559,146 | 10/1925 | Andrews | 188/250 G |
| 4,676,347 | 6/1987 | Rees | 188/250 B X |
| 4,775,036 | 10/1988 | Harrison | 188/250 B |

FOREIGN PATENT DOCUMENTS

| 0024275 | 2/1980 | Japan | 188/250 G |
|---|---|---|---|
| 4249629 | 9/1992 | Japan | 188/250 B |

Primary Examiner—Robert J. Oberleitner
Assistant Examiner—Peter M. Poon
Attorney, Agent, or Firm—G. J. Falce

[57] ABSTRACT

An improved railway brake shoe member characterized by longitudinally tapered sidewalls of the brake shoe that provide adaptive response to braking under conditions of mis-alignment between the brake shoe member and the tread of a railway car wheel by facilitating wear-in of the mis-aligned brake shoe, thereby assuring brake shoe/wheel tread engagement and accordingly alleviating degradation of braking efficiency and undesirable thermal inputs to the wheel flange that otherwise results from such brake shoe mis-alignment.

7 Claims, 6 Drawing Sheets

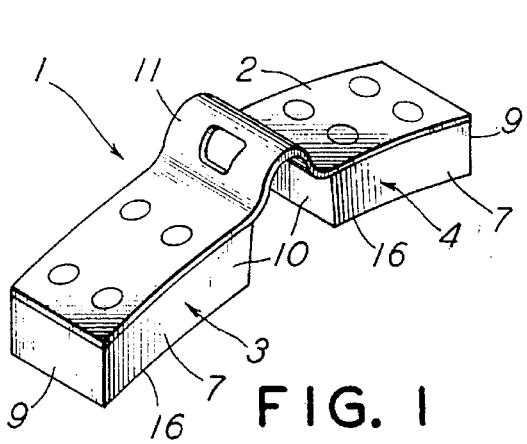
FIG. 1
PRIOR ART
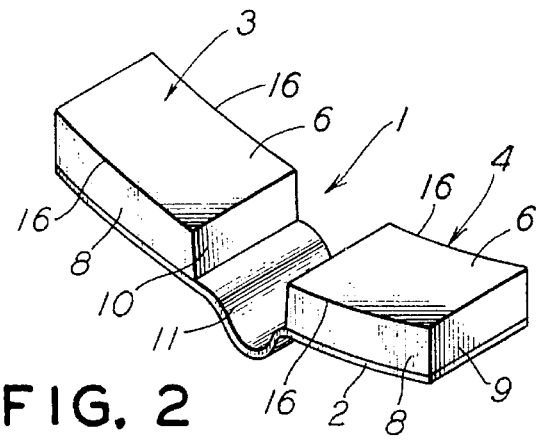
FIG. 2
PRIOR ART
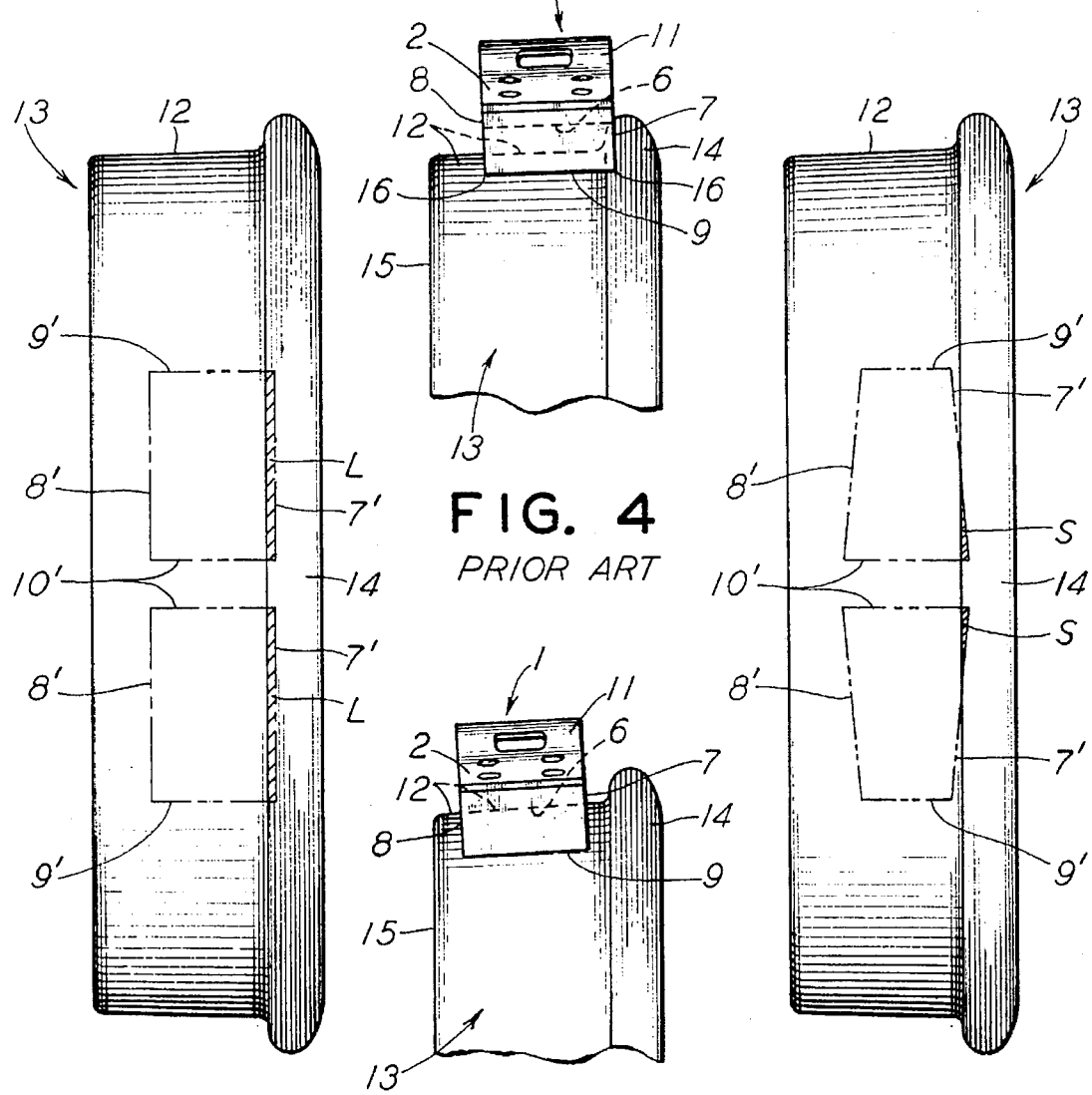
FIG. 4
PRIOR ART
FIG. 5
PRIOR ART
FIG. 3
PRIOR ART
FIG. 6

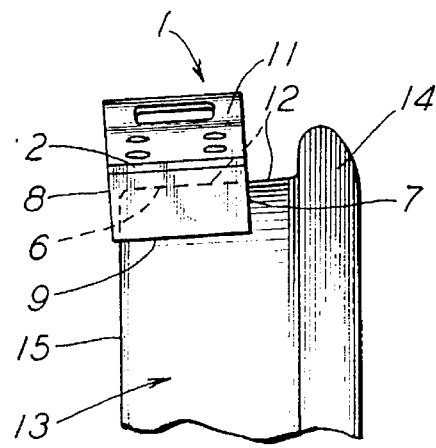
FIG. 7
PRIOR ART
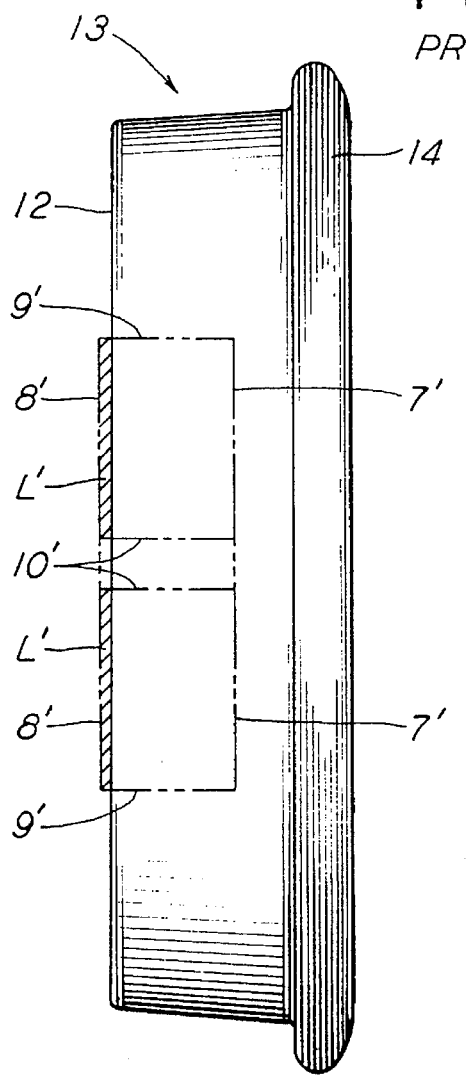 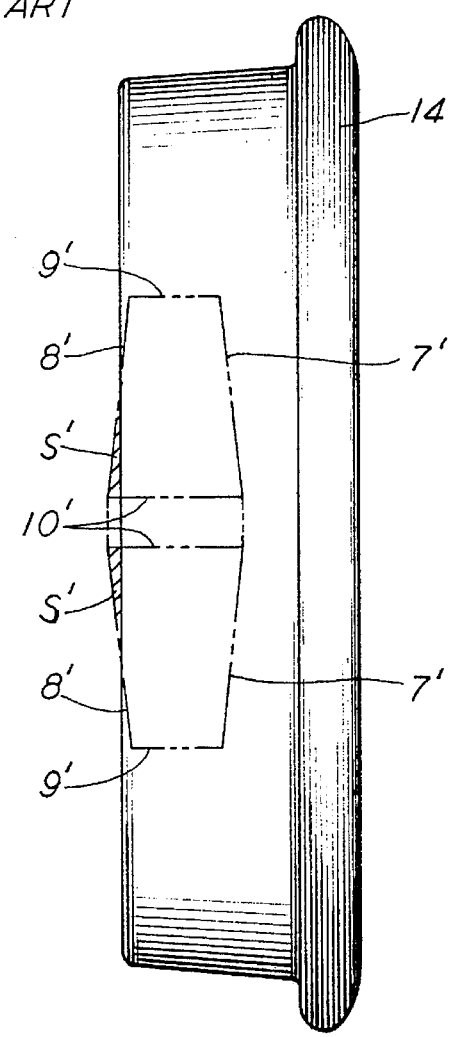
FIG. 8
PRIOR ART
FIG. 9

FIG. 14
FIG. 15
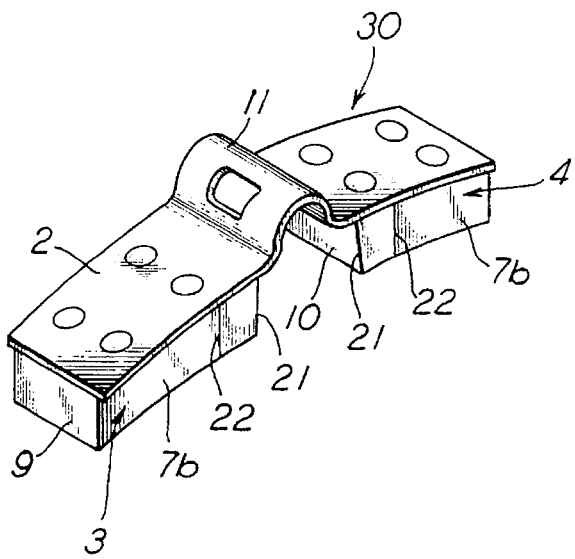
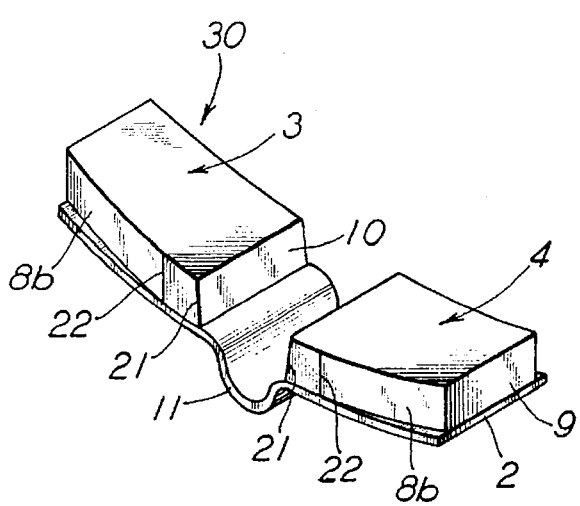
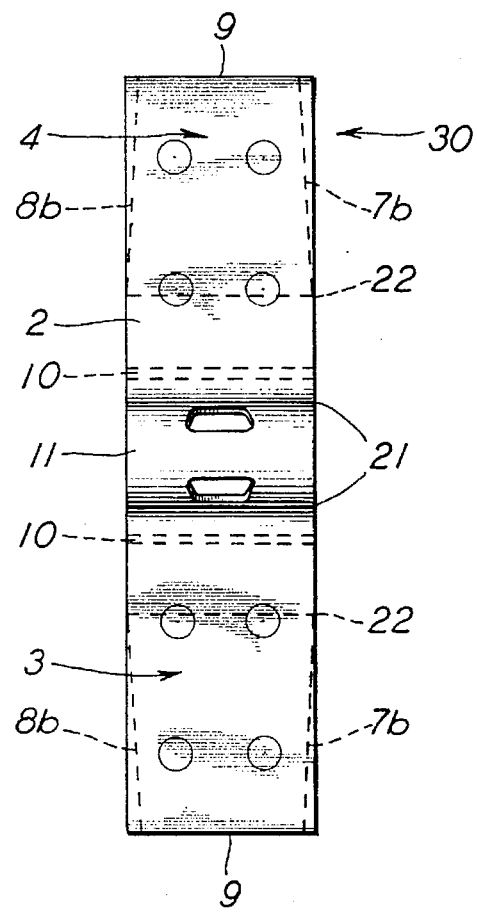
FIG. 16
FIG. 17

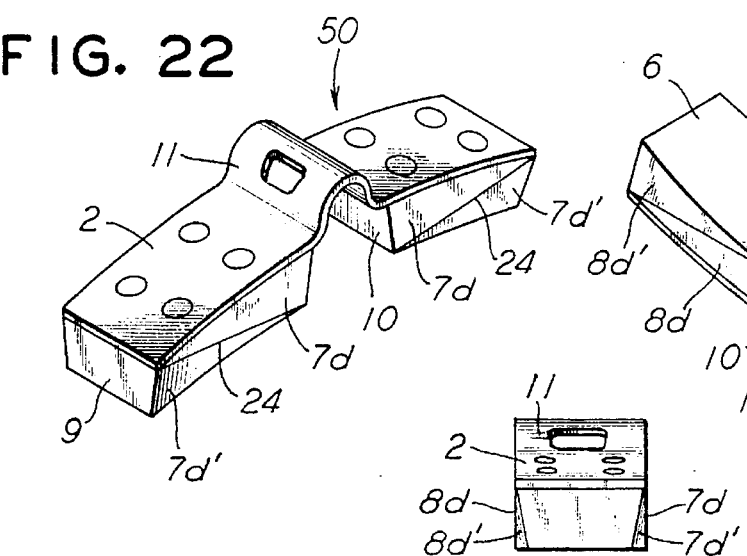
FIG. 22
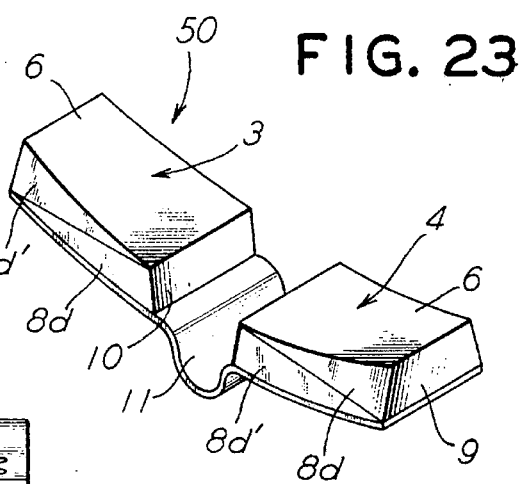
FIG. 23
FIG. 26
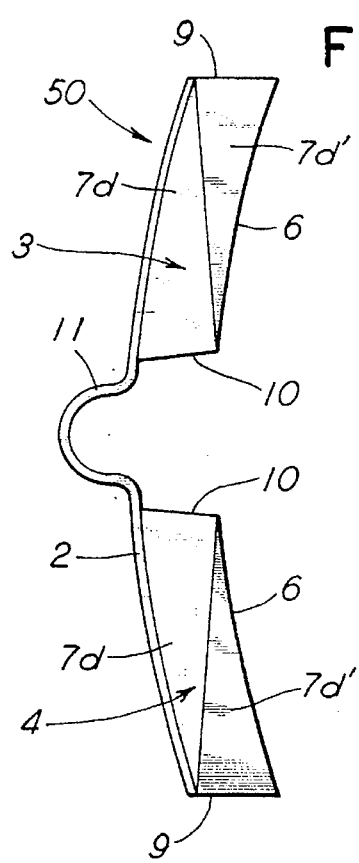
FIG. 24
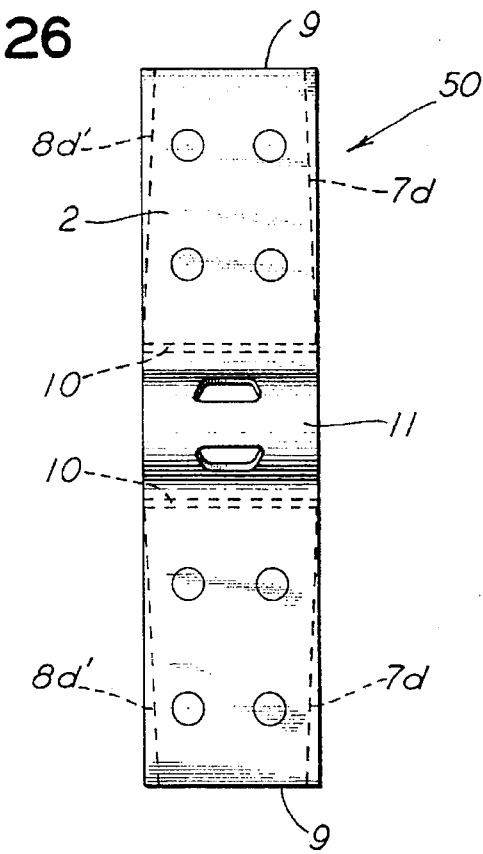
FIG. 25

RAILWAY BRAKE SHOE

BACKGROUND OF THE INVENTION

The present invention relates to an improved railway car brake shoe and particularly to an adaptive brake shoe configuration that accommodates brake rigging misalignment such that substantially no loss of braking efficiency occurs and the potential for undesirable heating of localized portions of the car wheel is minimized.

Mis-alignment of brake rigging on railway cars can occur due to bent rigging components, the dirty environment in which the brake rigging components are required to operate, poorly designed brake rigging, and track curvature.

This mis-alignment of brake rigging is detrimental, since one brake shoe carried by a given brake beam overrides the wheel flange, while the other brake shoe rides off the wheel rim. In the first instance, interference between the brake shoe and wheel flange prevents the brake shoe friction face from engaging the wheel tread, so that loss of braking occurs at that wheel. In the latter instance, a groove wears in the brake shoe face, which also affects the ability of the brake shoe to fully engage the wheel tread, when the brake rigging subsequently becomes aligned. In addition to the decreased braking efficiency resulting from mis-aligned brake rigging and consequent shifting of the brake shoe relative to the wheel/axle units, engagement of the brake shoe with the wheel flange can further generate high levels of heat in the wheel flange and accordingly a high temperature gradient across the wheel. This is believed to contribute to structural damage to the wheel, which ultimately represents a high cost to the railroads for wheel replacements.

SUMMARY OF THE INVENTION

It is therefore the principal object of the present invention to provide an improved railway type brake shoe capable of adapting to mis-aligned rigging conditions to alleviate degradation of braking efficiency.

It is a further object of the invention to provide a brake shoe in accordance with the foregoing without any loss in friction braking performance of the improved brake shoe under normal conditions of brake rigging alignment.

It is a still further object of the invention to provide an improved brake shoe having a low shoe/wheel flange friction characteristic without resorting to dissimilar frictional braking material.

Yet another object of the invention is to provide an improved brake shoe having a relatively small brake shoe/wheel flange contact area with but minimal modification of the standard brake shoe design.

A final object of the invention is to provide an improved railway type brake shoe in accordance with the foregoing without incurring any substantial increase in cost or reduction in strength.

In reaching these objectives, there is provided for frictional engagement with the tread of a railway car wheel a brake shoe member comprising a backing plate, a brake shoe block secured to the backing plate having an arcuate braking face conforming generally to the wheel tread for engagement therewith, and first and second sidewalls extending between the braking face and backing plate, the first sidewall being formed with a longitudinal taper such that during a brake application only a portion of the sidewall and/or brake shoe face abuts the wheel flange or rides off the wheel rim when the brake shoe member is mis-aligned relative to the railway car wheel.

BRIEF DESCRIPTION OF THE DRAWINGS

These and other objects and advantages of the invention will become apparent from the following more detailed explanation when taken in conjunction with the accompanying drawings in which:

FIGS. 1 and 2 are isometric views of a conventional type brake shoe employed in the railroad industry;

FIG. 3 is an end view showing the conventional brake shoe of FIGS. 1 and 2 in a properly aligned position relative to a railway car wheel;

FIG. 4 is an end view showing the conventional brake shoe of FIGS. 1 and 2 overriding the wheel flange due to mis-alignment of the brake rigging;

FIG. 5 is a diagrammatic view in which the area of engagement between the wheel flange and the conventional brake shoe of FIGS. 1 and 2 is represented by hatching, when the brake shoe is in the mis-aligned condition depicted in FIG. 4;

FIG. 6 is a diagrammatic view similar to FIG. 5 in which the area of engagement between the wheel flange and a brake shoe according to the present invention is represented by hatching when the brake shoe is in the mis-aligned condition depicted in FIG. 4;

FIG. 7 is an end view showing the conventional brake shoe of FIGS. 1 and 2 overriding the wheel rim due to mis-alignment of the brake rigging shifting the brake shoe in a direction away from the wheel flange;

FIG. 8 is a diagrammatic view illustrating the relationship of the conventional brake shoe of FIGS. 1 and 2 with the wheel rim when the brake shoe is shifted in the mis-aligned condition depicted in FIG. 7;

FIG. 9 is a diagrammatic view illustrating the relationship between the brake shoe of the present invention and the wheel rim when the brake shoe is shifted in the mis-aligned condition depicted in FIG. 7;

FIGS. 14 and 15 are isometric views of a brake shoe according to a second embodiment of the invention in which the brake shoe is formed with longitudinally tapered opposing sidewalls between which a maximum dimension is provided at a location intermediate the inner and outer ends of the respective brake shoe segments;

FIGS. 16 and 17 are side elevation and plan views respectively of the brake shoe of FIGS. 14 and 15;

FIGS. 22 and 23 are isometric views of a brake shoe according to a fourth embodiment of the invention in which the sidewalls of the respective brake shoe segments are formed with a compound taper.

FIGS. 24, 25 and 26 are side elevation, plan and end views respectively of the brake shoe of FIGS. 22 and 23.

DESCRIPTION AND EXPLANATION

Figure 10:
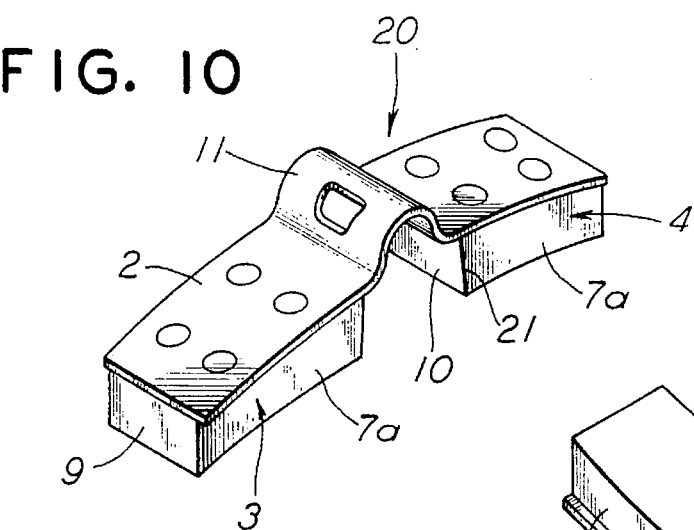
FIGS. 10 and 11 are isometric views of one embodiment of the invention showing a brake shoe having the sidewalls of the respective brake shoe segments thereof tapered longitudinally such that the maximum dimension of the braking face between the opposing sidewalls of each brake shoe segment is at the inner ends of the respective brake shoe segments.
Figure 11:
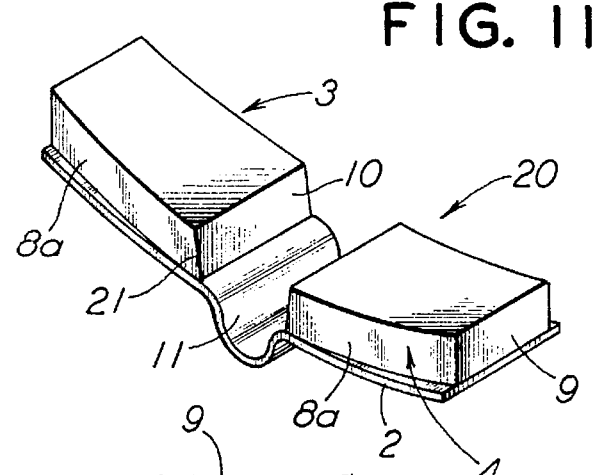
Figure 12:
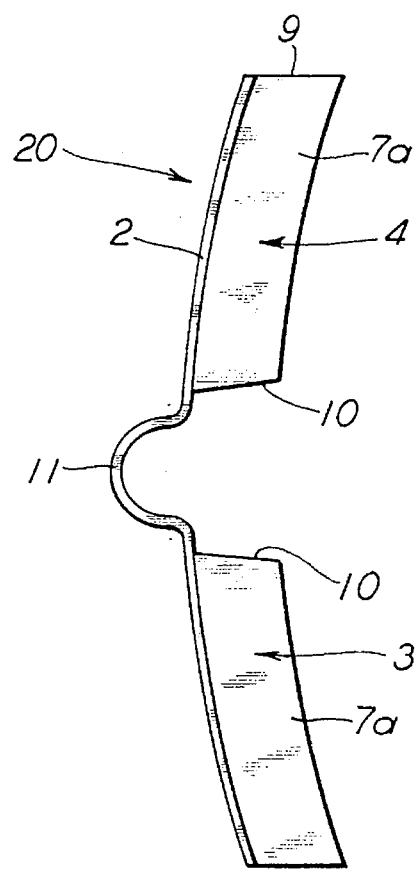
FIGS. 12 and 13 are side elevation and plan views respectively of the brake shoe of FIGS. 10 and 11.

Referring now to FIGS. 1 and 2, there is shown a conventional well-known railway type brake shoe member 1 having a metal, arcuately-shaped, rectangular backing plate 2 to which is secured, as by bonding, a pair of longitudinally-spaced brake shoe segments 3 and 4, each segment constituting a molded composition friction brake block.

The respective brake shoe segments 3 and 4 are molded with an arcuately shaped braking face 6 corresponding to the arcuate shape of a wheel tread with which the brake shoe is intended to frictionally engage. Each molded brake shoe segment 3 and 4 further includes laterally spaced sidewalls 7 and 8, and longitudinally spaced end walls 9 and 10 that extend from the backing plate 2 to the braking face 6. Backing plate 2 is provided with an upraised key bridge 11 in the area opposite the space between brake shoe segments 3 and 4 for acceptance of a retaining key (not shown) which secures the brake shoe member 1 to a brake head or the like (also not shown) in a well-known manner.

Sidewalls 7 and 8 of each brake shoe segment 3 and 4 are spaced to conform generally to the elongated sides of rectangular braking plate 2. Braking face 6 intersects sidewalls 7, 8 at edges 16 and is adapted to frictionally engage the tread 12 of a railway car wheel, as shown in FIG. 3, when brake shoe 1 is properly aligned between the wheel flange 14 and wheel rim 15.

In one case of a mis-aligned brake shoe, however, as shown in FIG. 4, brake shoe 6 is shifted toward flange 14, such that brake shoe face 6 overrides flange 14. During a brake application, therefore, the edge (16) formed by intersection of brake face 6 and sidewall 7 encounters an interference with flange 14, which prevents brake face 6 from engaging wheel tread 12. Since sidewall 7 extends longitudinally in a straight line parallel to the longitudinal side of rectangular backing plate 2, this area of interference extends along the entire length of brake shoe 1, as represented in FIG. 5 by the hatched areas L of the brake shoe "footprint" that is delineated by phantom lines 7', 8', 9' and 10'. Because of this relatively large area of interference, considerable wear-in is required before brake face 6 is able to engage wheel tread 12. Accordingly, the braking efficiency of such a mis-aligned brake shoe is severely degraded.

Moreover, this contact area L between edge 16 and flange 14 has the potential for creating excessive temperatures in the wheel flange, as previously discussed, leading to damaged wheels.

In another mis-aligned condition of brake shoe 1 shown in FIG. 7 and known as rim "ride-off" the brake shoe is shifted away from flange 14, such that sidewall 8 extends outboard of rim 15. While brake shoe/wheel tread engagement does occur in this condition of mis-alignment, the area of engagement of braking face 6 with tread 12 is reduced by the area of face 6 that rides off of the wheel tread. This area is represented in FIG. 8 by the hatched areas L' of the brake shoe "footprint" that is delineated by phantom lines 7', 8', 9' and 10', and also results in reduced brake efficiency. This reduced frictional engagement between braking face 6 and wheel tread 12 is aggravated by the face that during braking, a groove is worn in the braking face along the point where the brake face rides off of the tread. This groove subsequently prevents full brake face engagement with tread 12, until eventually worn smooth, thereby further contributing to the degraded braking efficiency caused by such misalignment.

In accordance with the present invention, several embodiments of which are shown, a new brake shoe member 20, 30, 40 and 50 is provided, similar parts as above described relative to conventional brake shoe 1 being identified by like reference numerals. This new brake shoe member 20, 30, 40 and 50 is characterized by longitudinally tapered sidewalls, 7a–8a, 7b–8b, 7c–8c, and 7d–8d respectively, which result in a "footprint" delineated by lines 7', 8', 9' and 10', as shown in FIG. 6 and 9.

Figure 13:
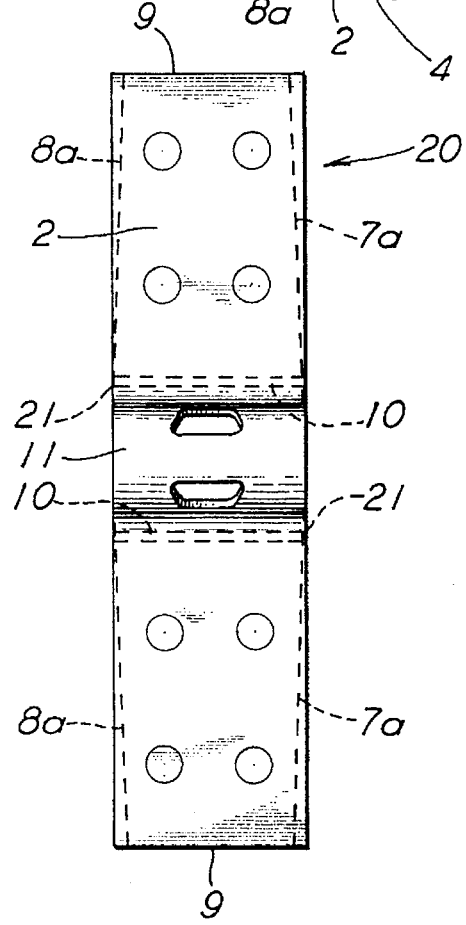
Figure 18:
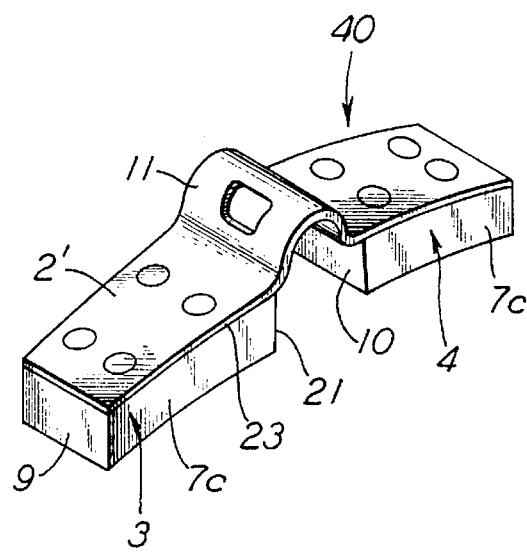
FIGS. 18 and 19 are isometric views of a brake shoe according to a third embodiment of the invention in which the brake shoe is formed with longitudinally tapered sidewalls and a correspondingly tapered backing plate.
Figure 19:
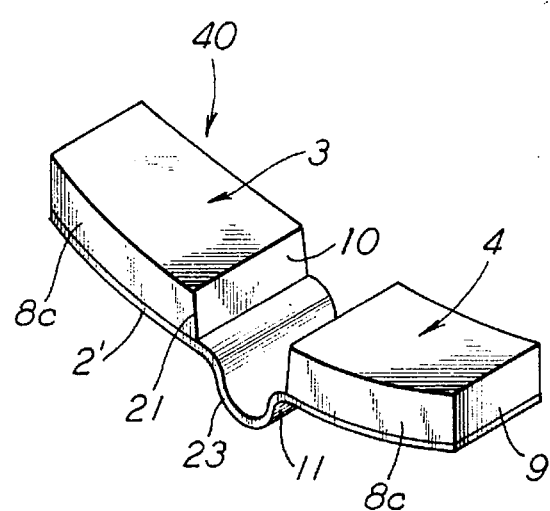
Figure 20:
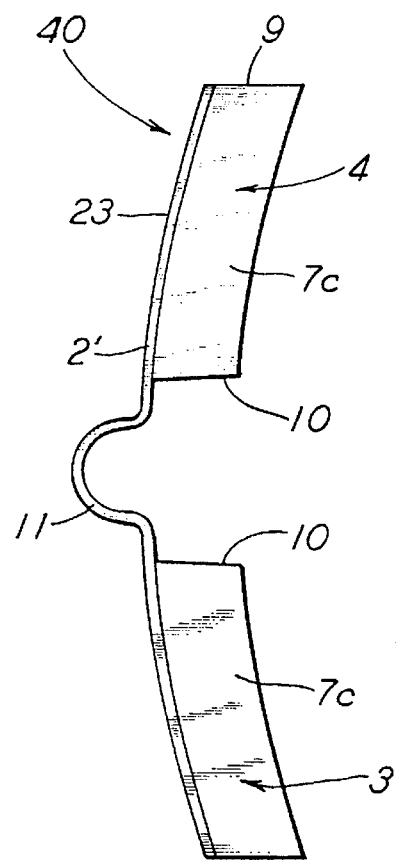
FIGS. 20 and 21 are side elevation and plan views respectively of the brake shoe of FIGS. 18 and 19.

In the embodiment of the invention shown in FIGS. 10–13, an orthographic projection of backing plate 2 shows the backing plate to have a rectangular shape in FIG. 13. Sidewalls 7a and 8a of each brake segment 3 and 4 are tapered in a longitudinal direction from end wall 10 inwardly to end wall 9. In this embodiment, the taper begins along an edge 21 where end wall 10 intersects sidewalls 7a and 8a, and extends along the entire length of brake shoe segments 3 and 4, such that the maximum lateral dimension of braking face 6 at each brake segment is at end wall 10 and the minimum lateral dimension of braking face 6 is at end wall 9 of each brake segment. Preferably, this taper of sidewalls 7a, 8a is rectilinear, as best viewed in FIG. 13, but could also be curvilinear without departing from the spirit of the invention. Sidewalls 7a, 8a are not only tapered along their full length, but the taper extends the full depth or thickness of the friction material comprising brake segments 3 and 4, thus extending from braking face 6 to braking plate 2. It is within the scope of the invention, however, to limit the depth of the taper so as to not extend completely to backing plate 2. In actual practice, this could be beneficial in retaining maximum bonding area between backing plate 2 and the respective brake shoe segments, while still achieving the benefits provided by tapered sidewalls 7a, 8a.

In the case of a mis-aligned brake shoe as shown in FIG. 4, these benefits include improved brake efficiency as compared to a conventional brake shoe subject to similar misalignment, as well as thermal protection of the wheel 13. Referring to FIG. 6, it will be seen that the tapered sidewall configuration of brake shoe 20 results in an area of contact S between braking face 6 of the respective brake shoe segments and wheel flange 14, that is considerably less than the contact area L between braking face 6 and wheel flange 14 of a conventional brake shoe 1 that is similarly misaligned. It will be appreciated, therefore, that contact area S, being relatively small, will provide for fast "wear in" of brake shoe 20, and consequently will facilitate eventual engagement of braking face 6 with wheel tread 12 to achieve a satisfactory degree of braking efficiency in spite of the mis-aligned condition of the brake shoe.

Furthermore, this fast "wear in" of brake shoe 20 will be achieved without creating thermal overheating of the wheel flange, due to this relatively small contact area S, which is a result of the tapered sidewall 7a of each brake segment 3 and 4.

In the case of brake shoe 20 being subject to mis-alignment known as rim "ride off" as shown in FIG. 7, sidewall 8a is shifted laterally away from flange 14, so as to extend outboard of rim 15, thereby reducing the contact area of braking face 6 with tread 12. In that sidewall 8a is tapered, however, a lesser portion of braking face 6 becomes grooved along sidewall 8a as compared to the full length of a conventional brake shoe 1 that is subject to a similar condition of mis-alignment. This can be appreciated by comparing the respective "footprints" of a conventional brake shoe 1, as shown in FIG. 8 and a brake shoe 20 according to the present invention, as shown in FIG. 9. It will be seen that the grooved area S' provided by brake shoe 20 is significantly reduced relative to the grooved area L' of a conventional brake shoe 1. Accordingly, faster "wear-in" of the grooved braking face 6 of brake shoe 20 will occur to facilitate full engagement of the braking face with tread 12 when brake shoe 20 is applied in a properly aligned condition following such mis-alignment. Again, this self-adaptive feature of applicant's improved brake shoe will be seen to enhance braking performance by achieving improved braking efficiency of a brake shoe subjected to mis-alignment resulting in rim "ride off".

In the embodiment of FIGS. 14–17, a brake shoe member 30 is provided having a longitudinal taper along sidewall 7b similar to that of brake shoe member 20, but differing in that the taper starts along a vertical edge 22 of sidewall 7b intermediate end walls 9 and 10, instead of along edge 21. The longitudinal location of this taper edge 22 along sidewall 7b thus determines the potential contact area S of brake shoe member 30 with wheel flange 14, which will be greater than the corresponding contact area of brake shoe member 20. While increasing this potential contact area obviously increases the heat generated in wheel flange 14, as well as the "wear in" time, in the event of brake shoe mis-alignment, as compared to that of brake shoe member 20, it still provides a reduced friction contact area with the wheel flange, as compared to conventional brake shoe member 1, and may provide the further advantage of improved lateral shoe stability over brake shoe member 20 during such mis-alignment. Sidewall 8b is preferably tapered identical to sidewall 7b to facilitate molding and to provide for universal application of the brake shoes, while still providing the improved brake efficiency over a conventional brake shoe in the face of rim "ride off" misalignment, as previously discussed relative to brake shoe 20.

Figure 21:
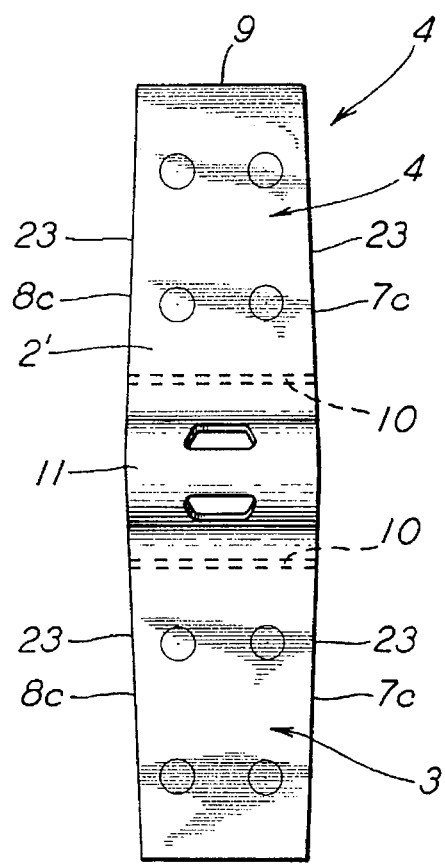

In the embodiment of FIGS. 18–21, a brake shoe member 40 is provided, having a longitudinally tapered backing plate 2', as best seen in FIG. 21 The taper of backing plate 2' preferably starts midway along the side 23 of backing plate 2' and is angled inwardly therefrom, sidewalls 7c and 8c of the respective brake shoe segments 3 and 4 following this taper so as to be flush with the side 23 of backing plate 2'. Alternatively, the taper of backing plate 2' may begin at any other location along side 23, including a location aligned with end wall 10 of each brake shoe segment 3 and 4.

In conforming sidewall 7c and 8c with side 23 of backing plate 2', it will be appreciated that sidewalls 7c and 8c are also tapered in order to provide the benefits hereinbefore discussed, in the event of brake shoe mis-alignment. At the same time, the tapered backing plate may facilitate the process of molding the friction brake material, of brake shoe member 30 to the brake shoe backing plate.

In the embodiment of FIGS. 22–25, a brake shoe member 50 is provided having a sidewall that includes a portion 7d corresponding to sidewall 7 of conventional brake shoe member 1, and a portion 7d' that has a compound taper, sidewall portion 7d' being tapered in both a longitudinal direction and a direction perpendicular thereto. The compound tapered portion 7d' extends between a generally diagonal line 24 and braking face 6. In that sidewall portion 7d above diagonal line 24 and backing plate 2 corresponds to that of conventional brake shoe member 1, maximum bonding area between backing plate 2 and brake shoe segments 3 and 4 is provided, while still obtaining the benefit of the tapered sidewall concept of the present invention. In providing the compound tapered sidewall portion 7d' and 8d', it will be appreciated that in the event of brake shoe mis-alignment, reduced areas S and S', as shown in FIGS. 6 and 9, exist. While the face area 6 of a new brake shoe 50 is the same as shown in the other embodiments, the actual friction material at the contact areas S and S' increases with shoe wear due to the compound taper, as compared to face area 6 remaining the same in the other embodiments as brake shoe wear progresses.

In each of the foregoing embodiments, the sidewall opposite sidewalls 7a, 7b, 7c and 7d of brake shoe segments 3 and 4 is preferably formed with a correspondingly tapered sidewall 8a, 8b, 8c and 8d, as shown, or alternatively may be formed with a sidewall corresponding to that of conventional brake shoe member 1, without departing from the spirit of the invention.

I claim:

1. For frictionally braking a railway car wheel having a tread, a brake shoe member comprising:

a) a backing plate to which a brake force is applied;

b) a brake shoe block comprising first and second separate brake shoe segments each having first and second sidewalls and opposing end walls delineating a braking face therebetween adapted to engage said wheel tread to provide said frictional braking of said railway car wheel;

c) said first sidewall of each of said first and second brake shoe segments having a longitudinal taper extending in opposite directions with corresponding angles of taper; and d) said opposing end walls of each of said first and second brake shoe segments including an inner end wall at one terminus of said first sidewall adjacent a longitudinal midpoint of said brake shoe member and an outer end wall at the other terminus of said first sidewall, the lateral dimension of said braking face decreasing in a direction from said inner end wall to said outer end wall of respective ones of said first and second brake shoe segments, such lateral dimension being greatest at said inner end wall thereof.

2. A brake shoe member as recited in claim 1, wherein said longitudinal taper of said first sidewall of said first and second brake shoe segments is such that the lateral dimension of said braking face thereof is greatest at a location intermediate said inner and outer end walls respectively.

3. A brake shoe member as recited in claim 2, wherein said longitudinal taper of said second sidewall is the mirror image of said longitudinal taper of said first sidewall.

4. A brake shoe member as recited in claim 1, wherein said second sidewall of each said first and second brake shoe segment is formed with a longitudinal taper that is the mirror image of said longitudinal taper of said first sidewall.

5. For frictionally braking a railway car wheel having a tread, a brake shoe member comprising:

a) a backing plate to which a brake force is applied;

b) a brake shoe block comprising first and second separate brake shoe segments each having first and second sidewalls and opposing end walls delineating a braking face therebetween adapted to engage said wheel tread to provide said frictional braking of said railway car wheel;

c) said first sidewall of each of said first and second brake shoe segments having a longitudinal taper extending in opposite directions with corresponding angles of taper;

d) said opposing end walls of each of said first and second brake shoe segments including an inner end wall at one terminus of said first sidewall adjacent a longitudinal midpoint of said brake shoe member and an outer end wall at the other terminus of said first sidewall, the lateral dimension of said braking face decreasing in a direction from said inner end wall to said outer end wall of respective ones of said first and second brake shoe segments; and e) said first sidewall of each of said first and second brake shoe segments further comprising;
  (i) a non-tapered portion; and
  (ii) a tapered portion having a compound taper including said longitudinal taper, said non-tapered and tapered portions intersecting along a generally diagonal line of said first sidewall.

6. A brake shoe member as recited in claim 5, wherein said compound taper of said tapered portion further includes a taper from said diagonal line of intersection to said braking face.

7. A brake shoe member as recited in claim 6, wherein said second sidewall of each of said first and second brake shoe segment is formed with a longitudinal taper that is the mirror image of said longitudinal taper of said first sidewall.

* * * * *